(12) United States Patent
Wilenski et al.

(10) Patent No.: US 9,857,148 B2
(45) Date of Patent: Jan. 2, 2018

(54) CONTROLLED FIBER-MATRIX ADHESION IN POLYMER FIBER COMPOSITES

(75) Inventors: Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 12/968,514

(22) Filed: Dec. 15, 2010

(65) Prior Publication Data
US 2012/0156452 A1 Jun. 21, 2012

(51) Int. Cl.
*B32B 5/08* (2006.01)
*B32B 7/02* (2006.01)
(Continued)

(52) U.S. Cl.
CPC ........... *F41H 5/0407* (2013.01); *B29C 70/54* (2013.01); *B32B 5/12* (2013.01); *B32B 5/14* (2013.01); *B32B 5/26* (2013.01); *F41H 5/0485* (2013.01); *B32B 2260/023* (2013.01); *B32B 2260/046* (2013.01); *B32B 2571/02* (2013.01); *Y02T 50/433* (2013.01); *Y10T 156/10* (2015.01);
(Continued)

(58) Field of Classification Search
CPC ... B32B 17/067; B32B 2307/412; B32B 5/12; B32B 5/08; B32B 5/14; B32B 2250/42; B32B 2260/023; B32B 2605/18; B32B 37/292; B32B 37/144; B32B 9/04; F41H 5/407; F41H 5/0407; F41H 5/0485; F41H 5/0478; C23C 14/0084; C23C 14/027; F01D 5/288; B29C 70/202; B29C 70/083; B29C 70/16; B29C 70/54; B29K 2995/0026; Y10T 428/24124; Y10T 428/24508; Y10T 428/29; Y10T 428/24942; Y10T 428/249928; Y10T 428/24994; Y10T 428/2976; Y10T 156/10; Y10T 156/1075
USPC ........ 428/397–400, 375, 378, 379, 369, 114, 428/105, 113; 89/905, 914; 29/419.1, 29/446; 156/60, 276
See application file for complete search history.

(56) References Cited

U.S. PATENT DOCUMENTS 5,047,281 A * 9/1991 Betz et al. .................... 428/201
5,108,678 A 4/1992 Hirasaka et al.
(Continued)

FOREIGN PATENT DOCUMENTS

EP 1132708 9/2001
EP 1923420 * 5/2008
(Continued)

OTHER PUBLICATIONS

EP192420 (translated), May 2008, Europe Bauder et al.*
(Continued)

*Primary Examiner* — Camie S Thompson

(57) ABSTRACT

A composite article includes a plurality of fibers at least partially embedded within a matrix. The fibers may be adhered to the matrix at a level of adhesion. The adhesion level between the fibers and the matrix may be varied spatially within the composite article. For example, the adhesion level may vary along a length of one of the fibers. The adhesion level may also vary among the fibers of a given layer. Furthermore, the adhesion level may vary between the layers of the composite article.

20 Claims, 10 Drawing Sheets

(51) Int. Cl.

| | | |
|---|---|---|
| *B32B 5/26* | (2006.01) | |
| *B32B 3/12* | (2006.01) | |
| *F41H 5/04* | (2006.01) | |
| *B32B 5/14* | (2006.01) | |
| *B32B 5/12* | (2006.01) | |
| *B29C 70/54* | (2006.01) | |

(52) U.S. Cl.
CPC ............... *Y10T 428/24942* (2015.01); *Y10T 428/249921* (2015.04)

(56) References Cited

U.S. PATENT DOCUMENTS

| | | | |
|---|---|---|---|
| 5,229,199 A | 7/1993 | Miner | |
| 5,665,450 A | 9/1997 | Day et al. | |
| 5,812,725 A * | 9/1998 | Petisce | 385/128 |
| 6,673,452 B1 | 1/2004 | Frenzel | |
| 2006/0002669 A1* | 1/2006 | Chiasson | G02B 6/4404 385/114 |
| 2008/0241537 A1 | 10/2008 | Sennett | |
| 2009/0297816 A1* | 12/2009 | Arvidson et al. | 428/221 |

FOREIGN PATENT DOCUMENTS

| | | |
|---|---|---|
| JP | S62065212 | 4/1987 |
| JP | H03047740 | 2/1991 |
| JP | H04306240 | 10/1992 |
| JP | H06091816 | 4/1994 |
| JP | H06126902 | 5/1994 |
| JP | H09254295 | 9/1997 |
| JP | 2001508003 A | 6/2001 |
| WO | WO9846422 A1 | 10/1998 |
| WO | WO2006002977 | 1/2006 |
| WO | WO2006124995 | 11/2006 |

OTHER PUBLICATIONS

International Search Report for PCT Application PCT/US2011/060025 dated Feb. 6, 2012.
Japanese Patent Office, Notice of Rejection for Application 2013-544483, dated Sep. 29, 2015.
Canadian Patent Office, Office Action for Application 2,817,683, dated Mar. 15, 2016.
Japanese Patent Office, Notice of Rejection for Application 2013-544483, dated Jun. 7, 2016.
Canadian Patent Office, Office Action for Application No. 2,817,683, dated Nov. 18, 2016.
European Patent Office, Office Action for Application No. 11802183.1-1308, dated Feb. 6, 2017.
Canadian Patent Office, Office Action for Application No. 2817683, dated Aug. 7, 2017.
U.S. Appl. No. 12/901,342, "Transparent Composites With Organic Fiber" by Michael Kozar et al. and filed Oct. 8, 2010.

* cited by examiner

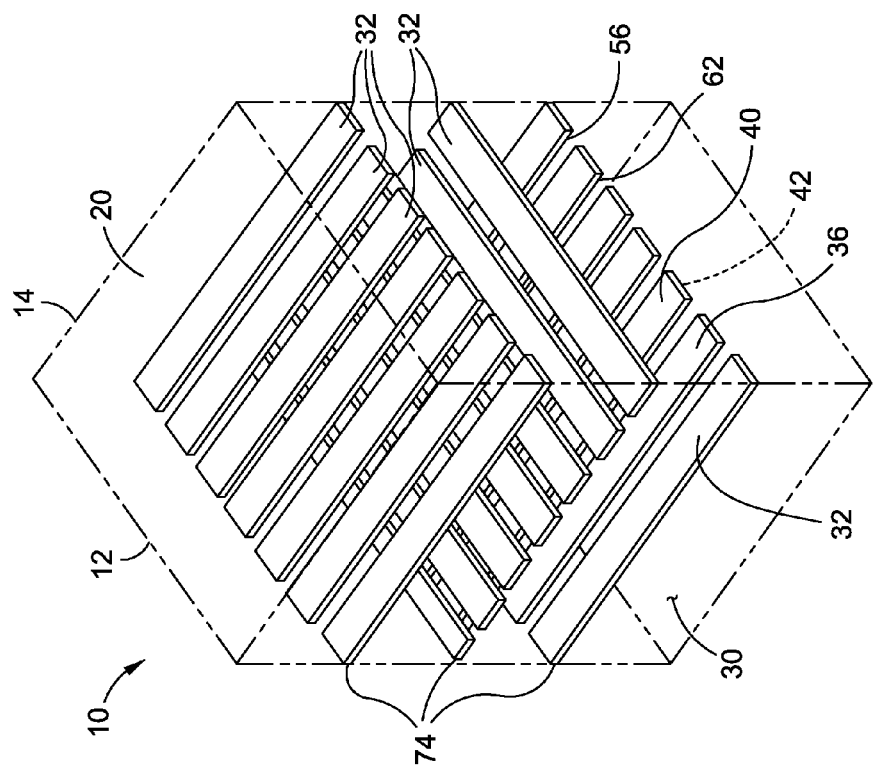
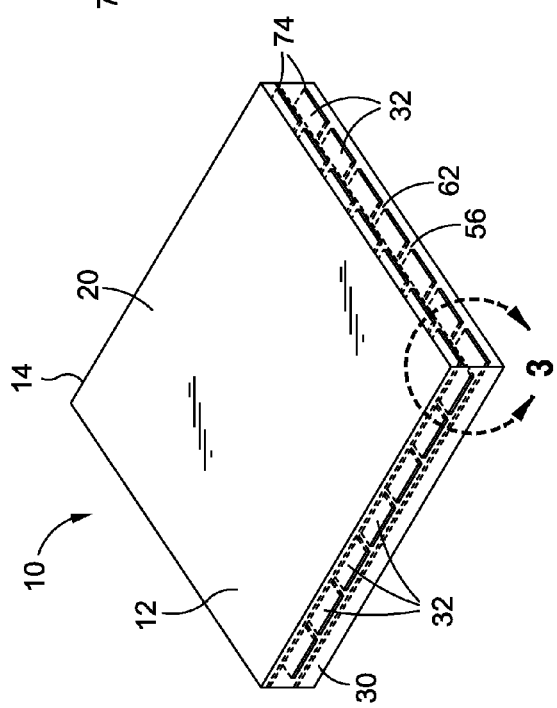

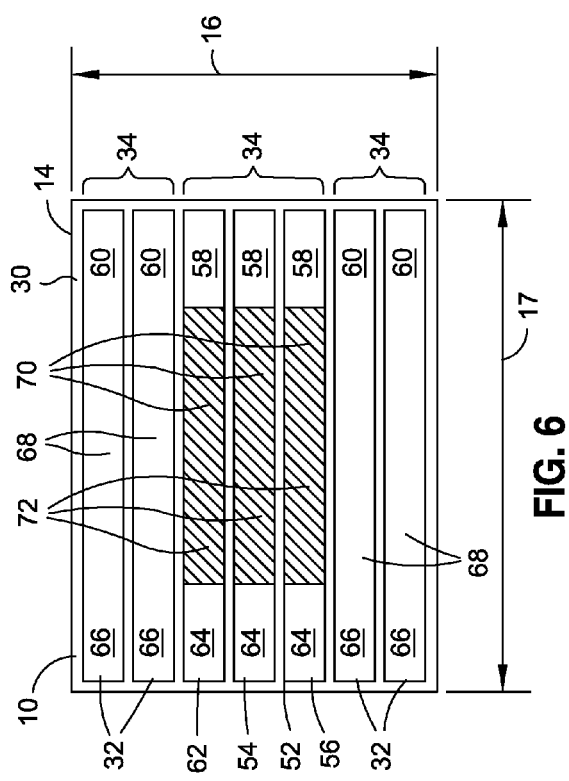
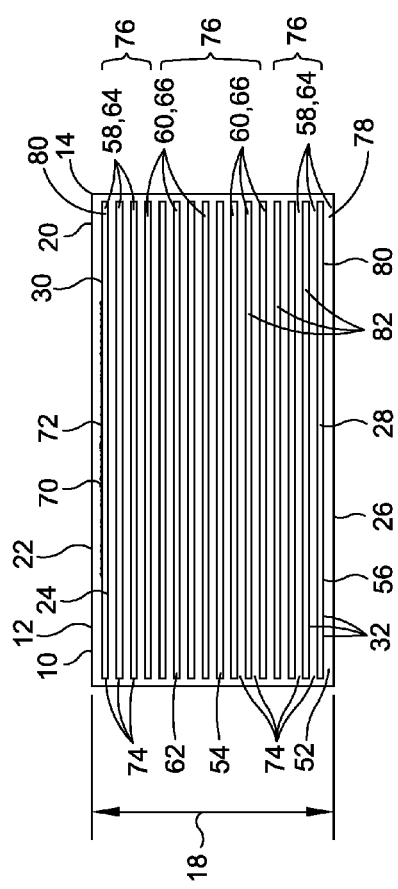

CONTROLLED FIBER-MATRIX ADHESION IN POLYMER FIBER COMPOSITES

FIELD

The present disclosure relates generally to composites and, more particularly, to fiber reinforced composite articles having improved ballistic performance.

BACKGROUND

Existing armor panels as currently known may be comprised of laminated sheets of various materials. For example, existing armor panels may be comprised of one or more sheets of glass and/or acrylic which may be laminated using suitable adhesives. In attempts to improve the ballistic resistance or performance of armor panels, manufacturers may add layers of polycarbonate material to the sheets of laminated glass and acrylic.

Although generally effective in absorbing energy from impacts and providing protection against projectiles, existing armor panels possess certain drawbacks which detract from their utility. For example, glass is a relatively dense material and therefore adds significantly to the overall mass and bulk of the armor panel at the thicknesses required to provide sufficient ballistic protection. A further drawback associated with certain armor panels is related to the mechanical properties of glass and other materials that make up certain armor panels. For example, it may be desirable in certain applications such as in vehicular applications that an armor panel is transparent.

Unfortunately, certain currently available transparent armor panels may suffer a significant loss in optical performance following an impact event. For example, for certain currently available armor panels, an impact in a localized area of the armor panel from a projectile may result in loss of optical performance in a significant portion of the remainder of the armor panel. Such loss in optical performance may be a result of crack propagation from the impact site.

As can be seen, there exists a need in the art for an armor panel which provides a high degree of optical transparency with improved ballistic performance and minimal weight.

BRIEF SUMMARY

The above-described needs associated with ballistic performance in armor panels are specifically addressed and alleviated by the present disclosure which, in an embodiment, provides a composite article including a plurality of fibers at least partially embedded within a matrix. The fibers may be adhered to the matrix at a level of adhesion. The adhesion levels may be varied spatially within the composite article. For example, the adhesion level may vary along a length of one of the fibers. The adhesion level may vary among the fibers of a given layer. Furthermore, the adhesion level may vary across the layers of the composite article.

In a further embodiment, disclosed is a composite article including a plurality of fibers at least partially embedded within a matrix. The fibers and the matrix may adhere to one another with one or more adhesion properties. The adhesion properties may vary spatially within the composite article. For example, the adhesion properties may vary along a length of a fiber. The adhesion properties may also vary among the fibers within a layer. The adhesion properties may further vary between at least two of the layers.

Also disclosed is a composite article including a plurality of fibers at least partially embedded within a matrix and wherein the adhesion level and/or the adhesion properties may vary spatially within the composite article according to any one of a plurality of arrangements. For example, the adhesion levels and/or adhesion properties may vary along a length of one of the fibers. The adhesion levels and/or adhesion properties may vary among the fibers of a given layer. Furthermore, the adhesion levels and/or adhesion properties may vary across the layers of the composite article.

Additionally disclosed is a method of manufacturing a composite article. The method may comprise embedding a plurality of fibers at least partially within a matrix. The fibers may be adhered to the matrix at a level of adhesion. The adhesion level may be varied spatially within the composite article. For example, the method may include varying the adhesion level along a length of at least one of the fibers, varying the adhesion level among the fibers of a layer of the fibers, and/or varying the adhesion level between at least two of the layers.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective illustration of a composite article in an embodiment comprising a substantially transparent matrix and a plurality of substantially transparent fibers;

FIG. 2 is an exploded perspective illustration of the composite article of FIG. 1 and illustrating a plurality of layers of the fibers embedded within the matrix;

FIG. 6 is a top view illustration of a composite article having at least one layer of fibers oriented substantially parallel to one another layer of fibers and further illustrating varying adhesion levels among groups of the fibers within one of the layers;

FIG. 7 is an end view of the composite article illustrated in FIG. 6 and illustrating layer groups having varying adhesion levels among the stack of layers;

DETAILED DESCRIPTION

Figure 3:
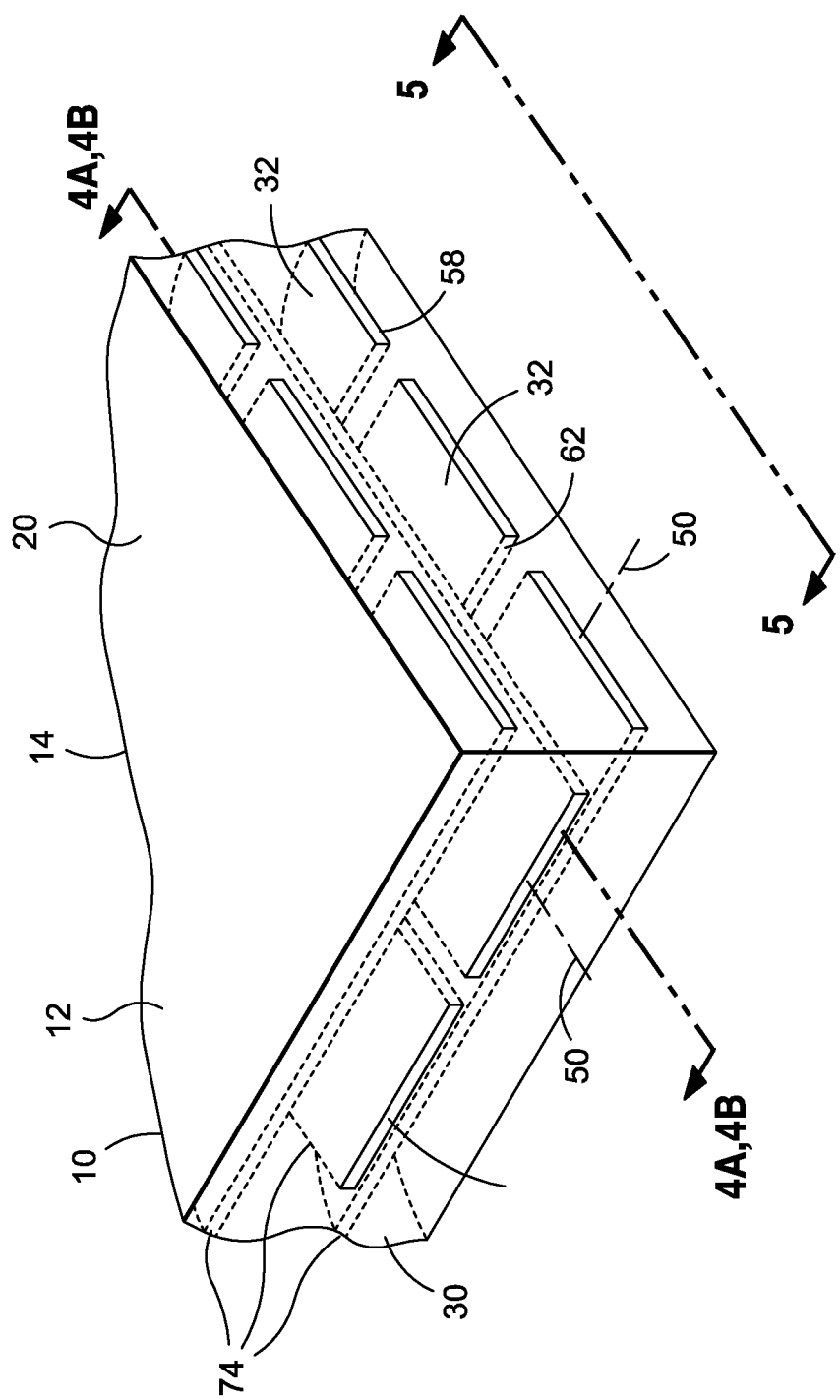
FIG. 3 is an enlarged perspective illustration of a portion of an embodiment of the composite article of FIG. 1 and illustrating the arrangement of the layers of fibers within the matrix.

Referring now to the drawings wherein the showings are for purposes of illustrating preferred and various embodiments of the disclosure, shown in FIG. 1 is an embodiment of a composite article 10. The composite article 10 may be fabricated as a fiber-reinforced composite panel 14 comprising a matrix 30 and a plurality of fibers 32 embedded within the matrix 30. The fibers 32 may be formed of substantially optically transparent fiber 32 material. Likewise, the matrix 30 may be comprised of a substantially optically transparent polymeric matrix 30 material although the matrix 30 may be formed of other material compositions. Although the composite article 10 is illustrated in FIG. 1 in a panel 14 configuration having substantially parallel panel 14 surfaces, the composite article 10 may be provided in any one of a wide variety of sizes, shapes and configurations, without limitation, and may include any number of planar surfaces and/or compound curvature surfaces.

Advantageously, the composite article 10 as illustrated in FIG. 1 is specifically configured to provide varying levels of adhesion between the fibers 32 and the matrix 30 throughout the composite article 10. By spatially varying the adhesion level 56 between the fibers 32 and the matrix 30, the amount and/or length of fibers 32 that are involved in an impact event may be controlled. More specifically, by spatially varying the fiber-matrix adhesion levels 56 throughout the composite article 10, the deceleration of a projectile or ballistic object passing through the composite article 10 can be controlled.

Furthermore, disclosed are embodiments of the composite article 10 wherein the adhesion levels 56 between the fibers 32 and the matrix 30 are spatially varied in a manner to control the failure modes of the fibers 32 as a function of distance or penetration of the projectile through the composite article 10. In this regard, the present disclosure provides the technical benefit of selectively increasing the amount or length of each fiber 32 that is involved in a ballistic event such that the tensile strain in each fiber 32 may be distributed through a relatively longer length of the fiber 32. By increasing the length of the fibers 32 that are involved in a ballistic event, the total amount of projectile energy absorbed by the fibers 32 may be increased.

Furthermore, by selectively varying the adhesion levels 56 throughout the composite article 10, relative movement of selected fibers 32 can be increased to increase the duration of a ballistic impact event resulting in an increase in the amount of time that the fibers 32 have for decelerating a projectile and increasing the amount of projectile energy that may be absorbed by the fibers 32. In addition, the present disclosure contemplates controlling or spatially varying the fiber-matrix 32, 30 adhesion levels 56 at different locations throughout the composite article 10 as a means for controlling the size of the area of the composite article 10 that is impacted or damaged by a projectile. Even further, the present disclosure contemplates controlling or spatially varying the fiber-matrix adhesion levels 56 as a means to control delamination or separation of adjacent layers 74 from one another during an event such as a ballistic event.

Referring to FIG. 1, shown is the composite article 10 which is formed in a panel 14 configuration and which comprises the plurality of fibers 32 embedded within the matrix 30. As was indicated earlier, the fibers 32 are preferably substantially optically transparent although one or more portions of the fibers 32 may be formed of opaque material or other materials having different levels of optical transparency. The fibers 32 may serve as structural reinforcing for the substantially transparent matrix 30 and may improve the mechanical performance of the composite material 10. For example, the fibers 32 provide structural reinforcing in a manner to improve the specific stiffness of the composite article 10 (i.e., stiffness of the composite article 10 divided by the composite article 10 density) due to increased tensile strength and modulus of elasticity of the fibers 32.

Referring to FIG. 2, shown is an exploded perspective illustration of the panel 14 of FIG. 1 and illustrating the plurality of fibers 32 generally formed as strips and arranged in layers 74 within the matrix 30. As can be seen in FIG. 2, the fibers 32 are shown as having an elongated cross-sectional shape preferably including an opposed pair of substantially planar fiber 32 faces such as upper and lower surfaces 40, 42. The fiber surfaces 36 of the fibers 32 may be arranged to be substantially parallel to a substantially planar article surface 12 of the composite article 10. Such an orientation of the fibers 32 within the matrix 30 may improve the optical performance of the composite article 10.

Referring to FIG. 3, shown is an enlarged perspective illustration of the composite article 10 wherein the fibers 32 are arranged in the layers 74 within the matrix 30. As shown in FIG. 3, the fibers 32 in each one of the layers 74 may be generally oriented substantially parallel relative to one another. In the embodiment illustrated in FIG. 3, the layers 74 may be arranged in a cross-ply configuration wherein the fibers 32 are oriented perpendicularly relative to the orientation of the fibers 32 in the immediately adjacent layers 74. However, the layers 74 may be arranged in a variety of alternative configurations. For example, the fibers 32 of one layer 74 may be oriented in any non-perpendicular angle (e.g., at 15°, 22.5°, 45°, 60°, 75°, etc.) relative to the fibers 32 of one or more of the layers 74.

Referring still to FIG. 3, although the composite article 10 is illustrated as having three layers 74 of fibers 32, any quantity of layers 74 may be provided. For example, the composite article 10 may include a single layer 74 of fibers 32 or tens or more layers 74 of fibers 32. Furthermore, the fibers 32 in each layer 74 are not limited to being oriented substantially parallel to one another as illustrated in FIG. 3. For example, a portion of the fibers 32 in a layer 74 may be oriented in non-parallel relation to one another. Even further, although FIGS. 1-3 illustrate the fibers 32 of each layer 74 generally being arranged in uniformly spaced relation to one another, the fibers 32 may be spaced in non-uniform arrangements. Even further, the fibers 32 in a layer 74 may be arranged in a woven (not shown) configuration and/or in the non-woven configuration illustrated in FIGS. 1-3. Additionally, one or more of the fibers 32 of one or more of the layers 74 may be placed in contacting or non-contacting relation with the fibers 32 of the same layer 74 and/or with the fibers 32 of adjacent layers 74.

Figure 4A:
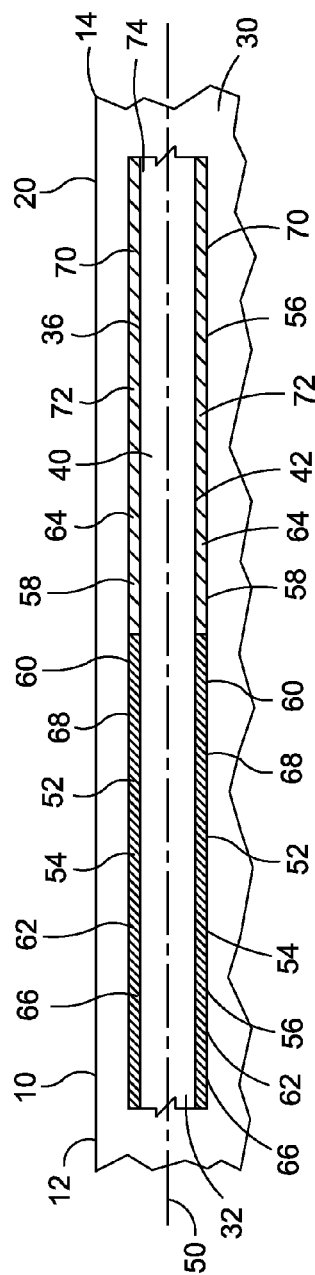
FIG. 4A is an enlarged sectional illustration of the composite article taken along line 4A of FIG. 3 and illustrating a portion of a length of one of the fibers having a varying level of adhesion between the fiber to the matrix along the fiber length.

Referring to FIG. 4A, shown is an enlarged illustration of one of the fibers 32 having varying adhesion levels 56 along a length of the fiber 32. The adhesion level 56 may be characterized as a measure of the strength of the bond 54 at an interface 52 between the fiber 32 and the matrix 30 and may comprise the strength of the bond 54 along a length of the fiber 32. It should be noted that in the context of the present disclosure, properties such as strength and strain are in terms of dynamic properties and/or quasi-static properties. FIG. 4A illustrates a fiber axis 50 of the fiber 32 extending along the fiber 32 length. The adhesion level 56 may be a measure of the strength of the bond 54 at the interface 52 between the fiber 32 and the matrix 30 along a direction substantially parallel to the fiber axis 50. However, the adhesion level 56 may also include the strength of the bond 54 at the interface 52 between the fibers 32 and the matrix 30 along non-parallel directions or in a direction transverse to the fiber axis 50.

Referring still to FIG. 4A, the adhesion level 56 may vary along the fiber 32 length and may be represented by a first adhesion level 58 at one portion of the fiber 32 length and a second adhesion level 60 at another portion of the fiber 32 length as illustrated in FIG. 4A. In this regard, FIG. 4A illustrates a stepwise change in the adhesion level 56 along the fiber 32 length. Such change in adhesion level 56 may be periodic along a length of the fiber 32 and may include multiple changes in the adhesion level 56 along the fiber 32 length. Alternatively, the variation in adhesion level 56 may be configured to be progressive such as a progressive or gradual increase or decrease in the adhesion levels 56 along the length of the fiber 32. For stepwise changes in adhesion level 56, the increase and/or decrease in adhesion level 56 may be repeated as a pattern of increases and/or decreases in the adhesion level 56 along the fiber 32 length. The pattern may comprise a single stepwise change in adhesion level 56 or multiple stepwise changes in the adhesion level 56. The adhesion level 56 along a fiber 32 length may alternate between relatively high levels of adhesion and relatively low levels of adhesion. The periodic change may also be generally uniform, stepwise varying, sinusoidally varying, or any number of a variety of configurations for varying the adhesion level 56 along the fiber 32 length.

Referring still to FIG. 4A, such changes in adhesion level 56 may be effectuated by improving the bond 54 strength or characteristics between the fiber 32 and matrix 30. In addition, changes in adhesion level 56 may be effectuated by reducing the bond 54 strength or characteristics at the interface 52 between the fiber 32 and matrix 30. For example, at least a portion of the fiber 32 may be provided or coated with a release agent 68 in order to reduce the adhesion level 56 of the fiber 32 at that portion of the fiber 32 length. The release agent 68 may comprise any one of a number of suitable release agents 68 including, but not limited to, a high surface tension coating, a mold release agent 68 such as FREKOTE™, or any other suitable release agent 68.

Conversely, the adhesion level 56 between the fiber 32 and the matrix 30 may be increased by coating at least a portion of one of the fibers 32 with a bonding agent 70 (FIG. 4A). The bonding agent 70 may comprise a chemical coating that improves the adhesion between the fiber 32 and the matrix 30. For example, bonding agents 70 such as silanes including, but not limited to, glycidoxy trimethoxysilane may be applied along at least a portion of a fiber 32 to increase the bond 54 between the fiber 32 and the matrix 30. Adhesion may also be increased by removing contaminants from a portion of a fiber 32. Such contaminants may include oils which may reduce the adhesion level 56 of the fiber 32 to the matrix 30 relative to a non-contaminated fiber 32. The fiber surfaces 36 (FIG. 4A) may be cleaned or treated in order to remove contaminants such as oils which may reduce the adhesion level 56 between the fiber 32 and the matrix 30. For example, fibers 32 may be cleaned with alcohol or acetone to remove contaminants.

Referring still to FIG. 4A, the adhesion level 56 of at least a portion of a fiber 32 may also be increased by locally mechanically modifying the surface configuration of the fiber 32. For example, the adhesion level 56 may be increased by increasing the surface roughness 72 of at least a portion of a fiber 32. In this regard, at least a portion of the fiber 32 may be abraded or otherwise processed to increase the surface roughness 72 of at least a portion of the fiber 32 relative to a remaining fiber 32 length. Increases in surface roughness 72 may result in locally modifying a relatively thin portion of the surface of the fiber 32 creating small protrusions that may extend laterally outwardly from the fiber surface 36 and which may be encapsulated by the matrix 30 and provide increased resistance against relative movement of the fiber 32 and the matrix 30 such as in an axial direction of the fiber 32. As can be seen in FIG. 4A, the portion of the fiber 32 length indicated as the first adhesion level 58 includes surface roughness 72 that increases the adhesion level 56 of a portion of the fiber 32 relative to the second adhesion level 60 along the same fiber 32.

Figure 4B:
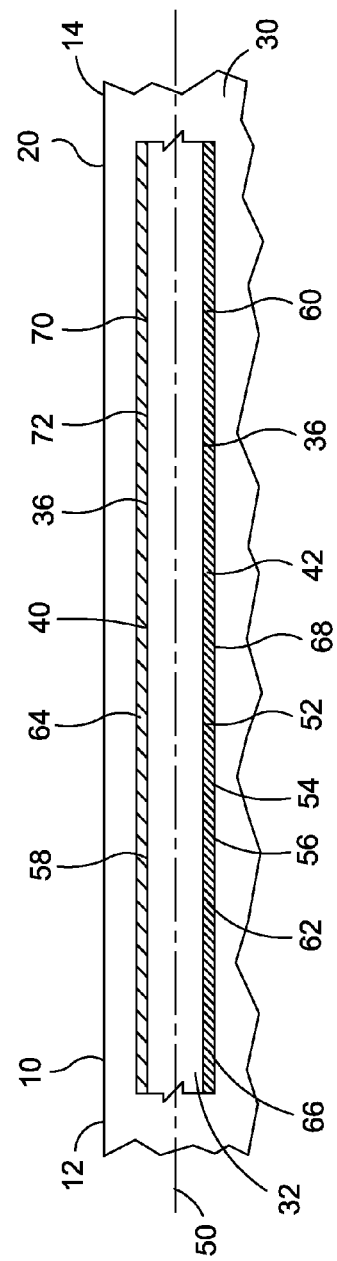
FIG. 4B is an enlarged perspective illustration taken along line 4B of FIG. 3 and illustrating a further embodiment of the composite article having varying adhesion levels between upper and lower surfaces of a fiber.

Referring to FIG. 4B, shown is an enlarged sectional illustration of a portion of a fiber 32 length wherein an upper surface 40 of the fiber 32 has a first adhesion level 58 which may be higher than a lower surface 42 of the fiber 32 which may have a second adhesion level 60. The second adhesion level 60 may be lower than the first adhesion level 58 due to the application of a release agent 68 to the lower surface 42 of the fiber 32. Likewise, the upper surface 40 of the fiber 32 may include a treatment to increase the surface roughness 72 in order to increase the adhesion level 56. In addition, a bonding agent 70 may be applied to the upper surface 40 to enhance the adhesion level 56 thereof.

Figure 5:
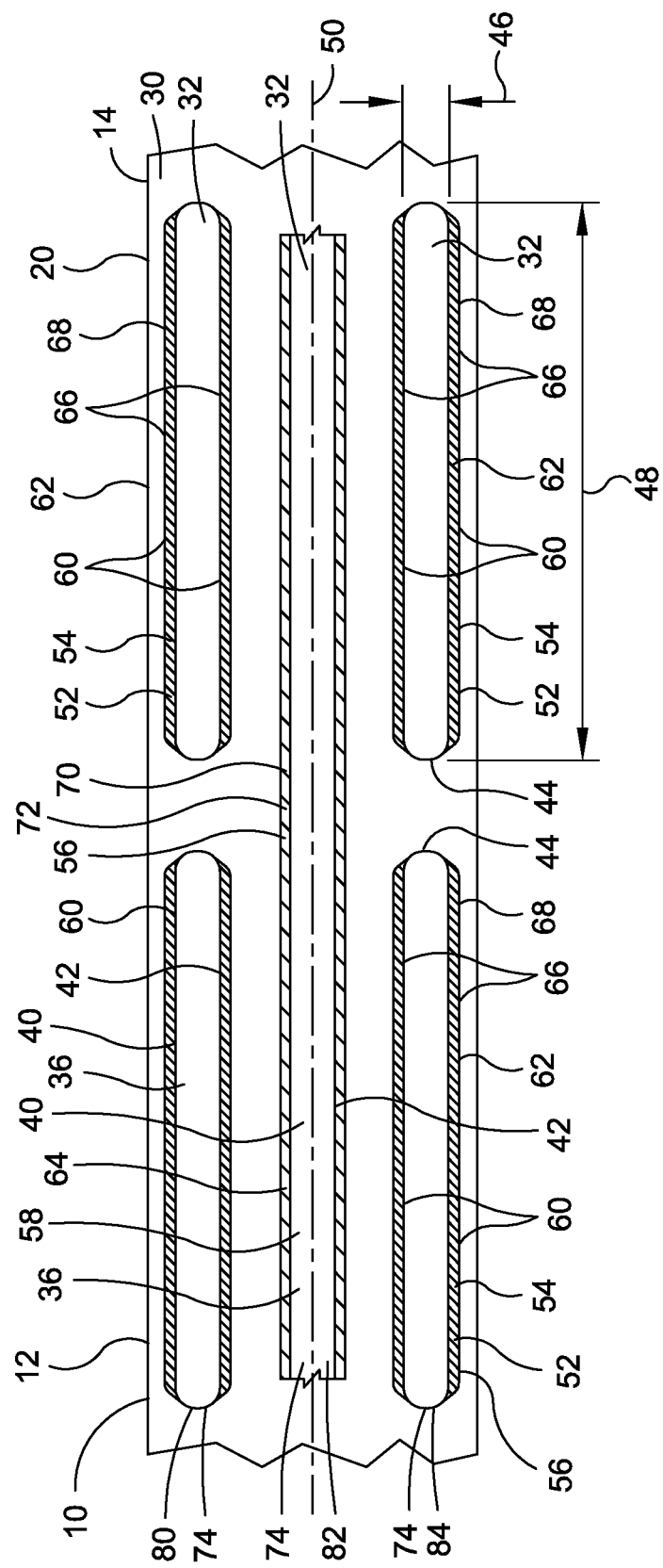
FIG. 5 is an enlarged side view of the composite article taken along line 5 of FIG. 3 and illustrating an embodiment having varying adhesion levels across the layers of the composite article.

Referring to FIG. 5, shown is an enlarged sectional illustration of the composite article 10 taken along line 5 of FIG. 3 and illustrating a plurality of layers 74 of the fibers 32 embedded within the matrix 30. As can be seen, the intermediate layer 82 of the fibers 32 may have a first adhesion level 58 while the outermost or uppermost layer 80 of the fibers 32 may have a second adhesion level 60 which may be different than the first adhesion level 58. Likewise, the lowermost layer 84 of the fibers 32 illustrated in FIG. 5 may be provided with an adhesion level 56 that may be similar to the adhesion level 56 of the uppermost layer 80 or which may be provided with an adhesion level 56 similar to the adhesion level 56 of the intermediate layer 82 of fibers 32. Alternatively, the lowermost layer 84 of fibers 32 may be provided with a different adhesion level 56 than the intermediate 82 or uppermost layer 80.

In this regard, FIG. 5 illustrates an embodiment of spatially varying the adhesion level 56 among or across the layers 74 of the composite article 10. It should be noted that arrangements for spatially varying the adhesion levels 56 may be provided in different combinations. For example, the variation in adhesion level 56 across the layers 74 as illustrated in FIG. 5 may be combined with variation of the adhesion levels 56 along the lengths of the fibers 32 in any one of the layers 74 similar to the variation in adhesion level 56 as illustrated in FIGS. 4A and 4B. Likewise, variations in adhesion levels 56 among the fibers 32 in a given layer 74 may be combined with variations in adhesion levels 56 across different layers 74 of the composite article 10. Even further, the fiber-matrix adhesion levels 56 may be varied according to the geometry of the composite article 10. For example, the adhesion levels 56 may be varied along the panel width 16 (FIG. 6) or panel length 17 (FIG. 6), along the panel thickness 18 (FIG. 7) or along any other geometric parameter of the composite article 10.

Referring briefly to FIG. 7, the variation in adhesion level 56 among the layers 74 may include progressively varying (i.e., progressively increasing or progressively decreasing) the adhesion level 56 of the fibers 32 within a stack 78 of layers 74. A stack 78 of layers 74 may represent any quantity of layers 74 in a composite article 10. The variation in adhesion level 56 across the layers 74 of the layer stack 78 may be provided in a stepwise manner wherein the adhesion level 56 varies from one group of layers 74 to another group of layers 74 in the stack 78. A group 76 of layers 74 may comprise adjacent layers 74 of any quantity including a single layer 74. One or more group 76 of layers 74 may have relatively higher adhesion levels 56 than adhesion levels 56 of an adjacent layer group 76 as described in greater detail below.

Furthermore, the variation in adhesion levels 56 across the layers 74 may be provided in a pattern of layer groups 76 and which may be a repeating pattern across the layer stack 78. The fibers 32 in each one of the layers 74 of a layer group 76 may have adhesion levels 56 that are substantially equivalent to the adhesion levels 56 of a non-adjacent group 76 of layers 74. In an embodiment, the fiber 32 in each layer 74 of a layer group 76 may have substantially equivalent adhesion levels 56. However, as indicated above, the present disclosure contemplates combining arrangements for varying the adhesion levels 56 within the composite article 10 including varying the adhesion levels 56 among fibers 32 (FIG. 6) within a given layer 74 in combination with varying the adhesion levels 56 across groups of layers 74 (FIG. 7).

Referring to FIG. 6, shown is a top view schematic illustration of a plurality of fibers 32 of a layer 74 (FIG. 7) embedded within the matrix 30 of a composite article 10 in a panel 14 configuration wherein the panel 14 has a panel width 16 and panel length 17. FIG. 6 illustrates an embodiment of the composite article 10 wherein the adhesion levels 56 may vary among the fibers 32 of the layers 74 (FIG. 7). For example, one or more fibers 32 in a layer 74 may have an adhesion level 56 that may be higher than one or more fibers 32 in the same layers 74. In this regard, FIG. 6 illustrates groups of fibers 34 of the same layers 74. A group of fibers 34 may comprise adjacent fibers 32 of any quantity within a given layer 74 (FIG. 7) and which may have a different adhesion level 56 than an adjacent fiber group 34.

FIG. 6 illustrates fiber groups 34 located along the edges of the panel 14. The fiber groups 34 are illustrated as having a second adhesion level 60. FIG. 6 also illustrates another fiber group 34 of a first adhesion level 58 located between the fiber groups 34 having the second adhesion level 60. The first adhesion level 58 may be different than the second adhesion level 60. For example, the first adhesion level 58 may be higher than the second adhesion level 60 to provide a relatively higher stiffness to the composite panel 14 at the location of the fiber groups 34 having the first adhesion level 58. As may be appreciated, the adhesion levels 56 among any given layer 74 may be distributed in any suitable arrangement and are not limited to the arrangement is illustrated in FIG. 6.

Referring still to FIG. 6, the variation or change in adhesion level 56 among the fibers 32 of any given layer 74 (FIG. 7) may be provided in any suitable manner including in a progressively increasing or decreasing change of adhesion levels 56 across a given layer 74 (FIG. 7). In addition, the adhesion levels 56 may be altered by improving the bond 54 strength or characteristics at the interface 52 between the fiber 32 and the matrix 30 or by reducing the bond 54 strength or characteristics at the interface 52 between the fiber 32 and matrix 30. For example, a group of fibers 32 may be coated with a release agent 68 to reduce the adhesion level 56 between the fibers 32 and the matrix 30. Alternatively, a bonding agent 70 may be applied to the fibers 32 to increase the chemical bond 54 between the fibers 32 and the matrix 30 such as by altering the polymer backbone stiffnesses and/or chain lengths of the fiber 32 compositions. In addition, the surfaces of the fibers 32 may be treated or processed such as by cleaning the fibers 32 to remove contaminants such as oil to increase the adhesion levels 56.

The adhesion levels 56 of the fibers 32 may also be increased by increasing the surface roughness 72 of the fibers 32 relative to the surface roughness 72 of the fibers 32 in their original or manufactured state. FIG. 6 illustrates the local application of surface roughness 72 to discrete portions of certain fibers 32. The local application of the surface roughness 72 may increase the adhesion level 56 at the locations of the fiber 32 length. In this manner, the fibers 32 in a given layer 74 (FIG. 7) may be treated locally in order to increase or decrease the adhesion level 56 in order to effectuate a desired response to an impact event of a projectile or object with the composite article 10.

In addition, the adhesion level 56 of a group of fibers 32 may be increased by using fibers 32 having different polymer fiber 32 compositions relative to the fiber 32 compositions of fibers 32 in other fiber groups 34 of the same layers 74 (FIG. 7). For example, fluorinated fibers 32 may be included within one group of layers 74 (FIG. 7) to provide reduced adhesion to the matrix 30 relative to the adhesion levels 56 of fiber groups 34 having non-fluorinated fibers 32. In addition, the adhesion levels 56 may be altered by using matrix 30 material having different matrix 30 compositions to provide reduced adhesion to the fibers 32.

Referring to FIG. 7, shown is a side schematic illustration of a composite article 10 having a plurality of layers 74. As mentioned above with regard to FIG. 5, a group of layers 74 may be provided with varying adhesion levels 56 among the layer stack 78. A group of layers 74 may comprise adjacent layers 74 of any quantity including a single layer 74. FIG. 7 illustrates a group of layers 74 at the uppermost portion of the composite article 10 having a first adhesion level 58 and the lowermost group of layers 74 also having a first adhesion level 58. The group of intermediate layers 82 located between the outermost layers 80 are illustrated as having a second adhesion level 60 which may be lower than the first adhesion level 58. Alternatively, an outermost group of layers 80 may have a first adhesion level 58 and the remaining layers 74 of the composite article 10 may have a second adhesion level 60 which may be higher than the first adhesion level 58.

In this regard, FIG. 7 illustrates the varying of the adhesion level 56 between layers 74 within a layer stack 78. The variation in adhesion levels 56 across the layers 74 of the layer stack 78 may be progressive such as a progressive or gradual increase or decrease or variation in adhesion levels 56 across the layer stack 78. The adhesion level 56 may be higher for a predetermined quantity or group of layers 74 within the layer stack 78 relative to the remaining layers 74 in the layer stack 78. Furthermore, the adhesion levels 56 may be varied within a given layer 74 of a stack 78. The adhesion levels 56 may also be varied along a length of a given fiber 32 within a layer 74. For example, FIG. 7 illustrates the localized application of surface roughness 72 to one or more fibers 32 in a layer 74 to locally increase the adhesion level 56 of the fibers 32. Other treatments may be provided to the fibers 32 to increase or decrease the adhesion levels 56.

Referring still to FIG. 7, the adhesion level 56 may be varied within a composite article 10 such as a composite panel 14 in order to provide a desired degree of movement of selected fibers 32 relative to the matrix 30. For example, the composite article 10 may be implemented as a ballistic panel 14 having opposing panel surfaces 20 and defining a panel thickness 18 as illustrated in FIG. 7. The panel 14 may be configured such that the fibers 32 in the layer(s) 74 nearest one of the panel surfaces 20 has an adhesion level 56 that differs by up to approximately 90% relative to the layer 74 nearest the opposite one of the panel surfaces 20. For implementation as a ballistic panel 14, the panel surfaces 20 may comprise a strike face 22 and a back face 26 as illustrated in FIG. 7. The strike face 22 may be configured to receive an impact from an object such as from a projectile and may be oriented, positioned or otherwise arranged to receive impacts from objects. The back face 26 may be on a side of the panel 14 opposite the strike face 22.

The adhesion level 56 of the fibers 32 in the layer(s) 74 nearest the strike face 22 may be greater than the adhesion levels 56 of the fibers 32 in the layer(s) 74 nearest the back face 26. By providing higher adhesion levels 56 in the layers 74 near the strike face 22, the portion 24 of the panel 14 near the strike face 22 may have a higher stiffness than the portion 28 of the panel 14 near the back face 26. A higher stiffness for the strike face 22 may facilitate absorbing a portion of the energy of the projectile during the initial portion of the impact with the strike face 22 causing deformation in the forwardmost portion of the projectile while an aft portion of the projectile continues to move. In this regard, a relatively stiff strike face 22 due to a relatively high adhesion level 56 of the layer 74 may increase dwell time during which the forwardmost portion of the projectile may be deformed. The deformation of the forwardmost portion of the projectile may comprise an enlargement of mushrooming of the forwardmost portion of the projectile which may increase the surface area for contacting fibers 32 and involving a larger percentage of fibers 32 for decelerating the projectile. In addition, a relatively higher stiffness in a portion of the composite article 10 near the strike face 22 due to relatively higher adhesion levels 56 near the strike face 22 may alternatively provide stiff support for an additional glass and/or ceramic layer (not shown) that may be bonded to the strike face 22.

In a further embodiment, the composite article 10 may be configured to provide a controlled degree of delamination of at least one layer 74 (FIG. 7) relative to an adjacent layer 74 of the composite article 10. In this regard, and referring to FIG. 7, the composite article 10 may be formed such that at least one pair of the layers 74 are bonded together with a low adhesion level 56 relative to the adhesion level 56 between one or more of the remaining layers 74 of the composite article 10. For example, the composite article 10 illustrated in FIG. 7 may be assembled with a low adhesion level 56 including, but not limited to, a zero-strength bond between at least one pair of adjacent layers 74 within the layer stack 78 of the composite article 10. In a non-limiting embodiment, the layer(s) 74 having a relatively low adhesion level 56 to one or more adjacent layers 74 may be located approximately midway through the depth of the layer stack 78. However, the selection of the location within the layer stack 78 for one or more pairs of layers 74 having low adhesion levels 56 may be at any location within the layer stack 78. For example, the layer(s) 74 having a relatively low adhesion level 56 with one or more adjacent layers 74 may be located in a portion of the composite article 10 adjacent to the back face 26 of the composite article 10.

Such relatively low adhesion level 56 may facilitate controlled delamination of at least a portion of such layers 74 (FIG. 7) from the composite article 10 and allowing such delaminated layers 74 or portions thereof to move laterally (i.e., generally parallel to the plane of a layer 74) and/or transversely (i.e., generally perpendicular to the plane of a layer 74) relative to the remaining layers 74 during a failure event such as a ballistic event. For example, by locating the layers 74 having relatively low adhesion level 56 at an intermediate location such as between intermediate layers 82 (FIG. 7) within the layer stack 78, a lower portion of the composite article 10 may delaminate from an upper portion of the composite article 10 in a controlled manner. Such controlled delamination may allow for lateral (i.e., in-plane) movement and/or transverse (i.e., out-of-plane) movement of the lower portion relative to the upper portion of the composite article 10 causing the delaminated layers 74 to absorb the kinetic energy of the projectile and decelerate the projectile.

In this regard, the delaminated layers 74 (FIG. 7) or portions of the composite article 10 may advantageously deform and deflect to a greater extent than the remaining portion of the composite article 10. Such increased deflection or deformation of the delaminated layers 74 may facilitate absorption of energy of a projectile and facilitate deceleration of the projectile as the layers 74 delaminate. The selection of the through-thickness location of the layer(s) 74 having low adhesion or no adhesion may be based upon the material properties of the fibers 32 and the matrix 30, the desired failure mode of the composite article 10 including the desired failure mode of the delaminated layers 74, and other factors.

Referring briefly to FIG. 5, the fibers 32 may be provided in any suitable configuration. For example, the fibers 32 may each have a fiber thickness 46 and fiber width 48 sized such that the fiber 32 has a generally elongated cross-sectional shape as illustrated in FIG. 5. The cross-sectional shape may be provided with relatively flattened or substantially planar fiber surfaces 36 to minimize scattering of light at the interface 52 between the fiber 32 and the matrix 30. In this regard, the generally elongated shape of the fibers 32 having substantially planar upper and lower surfaces 40, 42 may improve the optical quality of the composite article 10.

In addition, the substantially planar fiber surfaces 36 (FIG. 5) are preferably oriented substantially parallel to the article surfaces 12 of the composite article 10. However, the fibers 32 may be embedded within the matrix 30 such that the fiber surfaces 36 are oriented in any desired orientation relative to the article surface 12. Even further, although illustrated in FIG. 5 as being substantially planar, the fiber surfaces 36 may be slightly curved (i.e., slightly concave, slightly convex, crowned) and are not limited to a strictly substantially planar or flat profile. In addition, the fibers 32 are preferably arranged such that the side edges 44 are disposed in spaced relation to one another although the fibers 32 may be arranged such that the side edges 44 are in contacting relation with one another. In addition, although illustrated as a generally rectangular shape, the fibers 32 may be provided in any suitable cross-sectional shape including, but not limited to, a polygon, a quadrilateral, a square, a rectangle and any other suitable shape.

As was indicated above, the fibers 32 may be comprised of any suitable fiber 32 material and, preferably, are comprised of substantially optically transparent fiber 32 material. Likewise, the matrix 30 may be formed of any suitable matrix 30 material and preferably, may be formed of substantially optically transparent polymeric matrix 30 material. Likewise, the interface 52 (FIG. 5) between the adhesive bond 54 between the fibers 32 and the matrix 30 may also be substantially optically transparent. However, the composite article 10 may be configured such that the matrix 30, fibers 32 and/or interface 52 are opaque or having varying levels of optical transparency varying between substantially optically transparent to substantially opaque along a length or width of the composite article 10.

The matrix 30 and the fiber 32 may be formed of any suitable thermoplastic, thermosetting resin or glass material. For example, the matrix 30 and/or fiber 32 may be formed of a thermoplastic material comprising at least one of the following materials: fluorocarbons, polyamides, polyethylenes, polyesters, polypropylenes, polycarbonates, polyurethanes, polyetheretherketone, polyetherketoneketone and any other suitable thermoplastic material. Likewise, the fiber 32 and matrix 30 may be formed of a thermoset which may include any one of the following: polyurethanes, phenolics, polyimides, bismaleimides, polyesters, epoxies and any other suitable thermoset material. Even further, the fibers 32 and/or the matrix 30 may be formed of glass comprising E-glass (alumino-borosilicate glass), S-glass (alumino silicate glass), pure silica, borosilicate glass and/or optical glass.

In addition, the composite article 10 (FIGS. 1-10) may be configured in any one of a variety of different shapes, sizes and configurations. For example, the composite article 10 may be configured for use in any vehicular or non-vehicular application. In this regard, the composite article 10 may be configured as a transparency of a vehicle such as an aircraft. For example, the composite article 10 may comprise a windshield or a canopy of an aircraft. The composite article 10 may also be configured in other configuration such as a membrane, a structural panel, an architectural panel, a nonstructural panel 14 or article, or any other implementation of the composite article 10.

The composite article 10 may additionally be configured to have varying adhesion properties 62 (FIG. 5) within the composite article 10 wherein the adhesion properties 62 between the fibers 32 and the matrix 30 may vary spatially within the composite article 10. The adhesion properties 62 may represent the properties of the adhesive bond 54 between the fibers 32 and the matrix 30 such as at the interface 52 as illustrated in FIGS. 1-5. The adhesion properties 62 may vary spatially within or throughout the composite article 10 in any number of the arrangements described above with regard to the spatial variation in adhesion levels 56 throughout the composite article 10.

The adhesion properties 62 may include relative strength, stiffness, ductility, strain-to-failure and other properties of the adhesive bond 54 and which may be varied throughout the composite article 10. For example, the adhesion properties 62 may be varied along a length of one or more of the fibers 32 such as a periodic variation in adhesion properties 62 of the adhesive bond 54 along a portion of a fiber 32 or along the total fiber 32 length. In addition, the adhesion properties 62 may vary among the fibers 32 of a layer 74 (FIG. 5) within the composite article 10. For example, the stiffness of the adhesion between the fibers 32 and the matrix 30 may vary from fiber 32 to fiber 32 within a layer 74. In this regard, one or more layers 74 or a group of layers 74 may have a relatively higher stiffness than an adjacent group of layers 74. The adhesion properties 62 may vary from layer 74 to layer 74 (FIGS. 5-6) or between layer groups 76 (FIG. 7) to increase the stiffness in localized portions of the composite article 10.

For example, FIGS. 4A-4B illustrate a first adhesion property 64 in one portion of the fiber 32 and a second adhesion property 66 in another portion of the same fiber 32. FIG. 6 illustrates a first adhesion property 64 in fiber groups 34 located adjacent the edges of the panel 14 and a second adhesion property 66 in a fiber group 34 located intermediate the fiber groups 34 having the first adhesion property 64. Likewise, FIG. 7 illustrates a first adhesion property 64 in the layer group 76 nearest the uppermost portion of the panel 14 and a second adhesion property 66 in the layer group 76 located below the layer group 76 having the first adhesion property 64.

For example, the composite article 10 may be configured such that the adhesion properties 62 (FIGS. 4A-7) result in a higher stiffness of the adhesive bond 54 between the fiber 32 and the matrix 30 for the layer 74 nearest one of the article surfaces 12 such as the uppermost article surface 12 illustrated in FIG. 7. Conversely, the stiffness of the adhesive bond 54 between the fiber 32 and the matrix 30 in the layer 74 nearest the opposite or lowermost article surface 12 may be less than the stiffness of the adhesive bond 54 in the layer(s) 74 nearest the uppermost article surface 12 as illustrated in FIG. 7. Even further, the fiber-matrix adhesion levels 56 (FIGS. 6-7) may be spatially varied in a manner to control delamination or separation of adjacent layers 74 from one another during an event such as a ballistic event. In this regard, the adhesion properties 62 may be varied spatially within the composite article 10 in any desired arrangement similar to that which is described above with regard to the spatial variation in adhesion levels 56.

Figure 12:
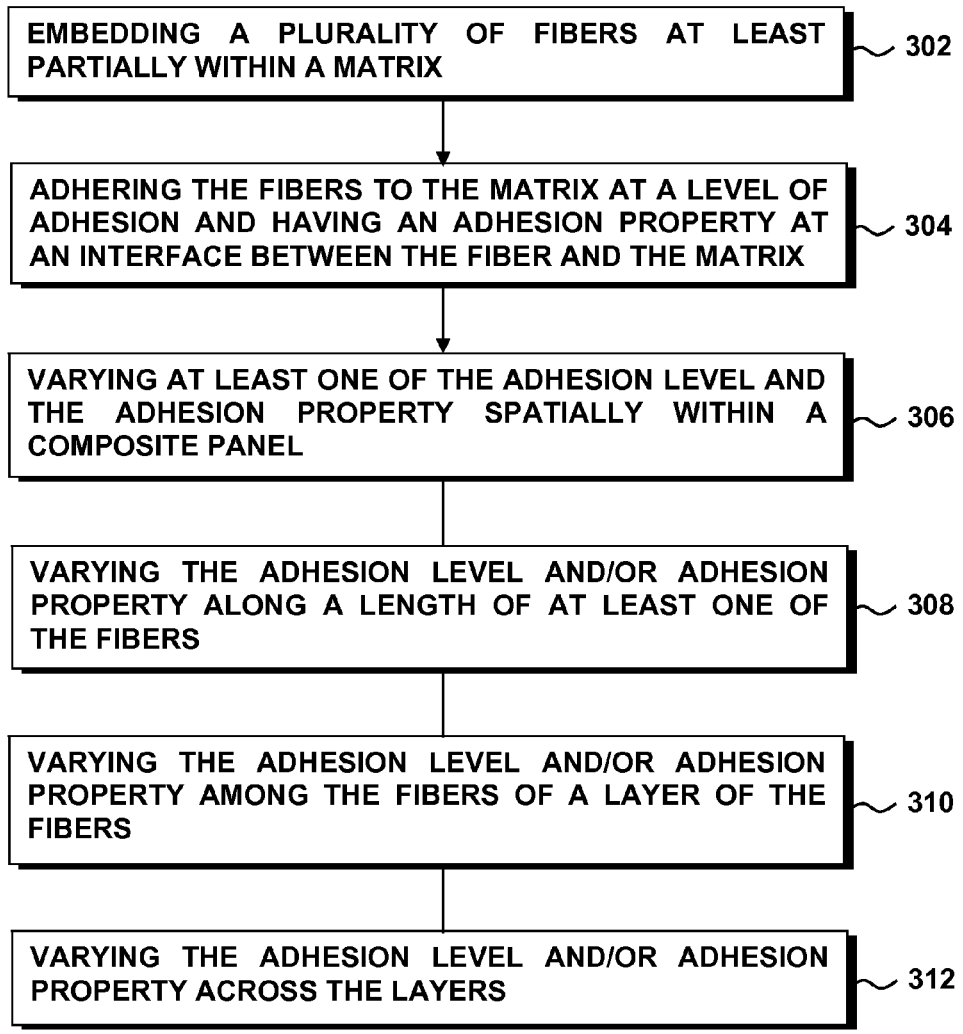
FIG. 12 is an illustration of a flow chart including one or more operations that may comprise a methodology of manufacturing a composite article.

Referring to FIG. 12, shown is a flow chart illustrating one or more operations that may be implemented in a methodology for manufacturing a composite article 10. Step 302 of FIG. 12 may include embedding a plurality of fibers 32 at least partially within the matrix 30 similar to that which is illustrated in FIGS. 1-5. The fibers 32 may be embedded at least partially or fully within the matrix 30. Furthermore, the fibers 32 may be oriented in any suitable arrangement including in cross-ply configuration as illustrated in FIGS. 2-3. However, the layers 74 of fibers 32 may be oriented in any one of a variety of angles relative to adjacent layers 74.

Step 304 of the methodology of FIG. 12 may include bonding the fibers 32 to the matrix 30 at a desired level of adhesion 56 and/or with an adhesion property 62 (FIGS. 4A-7). The adhesion level 56 may be characterized as a representation of the strength of the bond 54 (FIGS. 4A-7) at the interface 52 between the fibers 32 and the matrix 30 and may comprise the strength of the bond 54 along a length of the fiber 32. The adhesion properties 62 may include relative strength, stiffness, ductility, strain-to-failure and other properties of the adhesive bond 54 and which may be varied throughout the composite article 10.

Step 306 of the methodology illustrated in FIG. 12 may include varying at least one of the adhesion level 56 (FIGS. 4A-7) and the adhesion property 62 (FIGS. 4A-7) spatially within the composite article 10 according to a desired configuration or performance goal of the composite article 10. For example, step 308 may comprise varying the adhesion level 56 and the adhesion property 62 along a length or a portion of the length of at least one of the fibers 32. As described above with regard to FIG. 4A, the adhesion level 56 at one portion of the fiber 32 length may be different than the adhesion level 56 at another portion of the fiber 32 length and may be effectuated by applying a bonding agent, a release agent 68 (FIGS. 4A-6) or applying surface roughness 72 (FIGS. 4A-6) to the fiber surface 36 along a portion of the fiber 32 length. In addition, the adhesion level 56 may be varied by altering the chemistry between the fiber 32 and the matrix 30. For example, one or more of the fibers 32 in the composite article 10 may have a different composition than the remaining fibers 32 to provide increased or reduced levels of adhesion to the matrix 30 relative to the remaining fibers 32. For example, fluorinated fibers 32 may provide a reduced adhesion to the matrix 30 relative to non-fluorinated fibers 32.

Step 310 of the methodology illustrated in FIG. 12 may comprise varying the adhesion level 56 and/or the adhesion property 62 among the fibers 32 of at least one of the layers 74 similar to that which is illustrated in FIG. 6. For example, FIG. 6 illustrates fiber groups 34 which may be comprised of one or more fibers 32 adjacently disposed to one another and which may be provided with different adhesion levels 56 or adhesion properties 62. The adhesion level 56 and/or the adhesion properties 62 among the fibers 32 of the layers 74 may be varied by applying bonding agents 70, release agents 68, surface roughness 72, or different fiber 32 or matrix 30 compositions.

Step 312 may comprise varying the adhesion level 56 and/or the adhesion property 62 between layers 74 or across a group of layers 74 within the layer stack 78. In this regard, FIG. 7 illustrates layer groups 76 which may include one or more layers 74 having adhesion levels 56 which are different than the adhesion level 56 of an adjacent layer 74 group. The layer groups 76 may be provided in patterns which may be uniform or repeating and which may be progressively increasing or decreasing across a layer stack 78. The adhesion levels 56 may be optimized to effectuate a desired response of the composite article 10 to an event such as an impact of a projectile with the composite panel 14.

Figure 8:
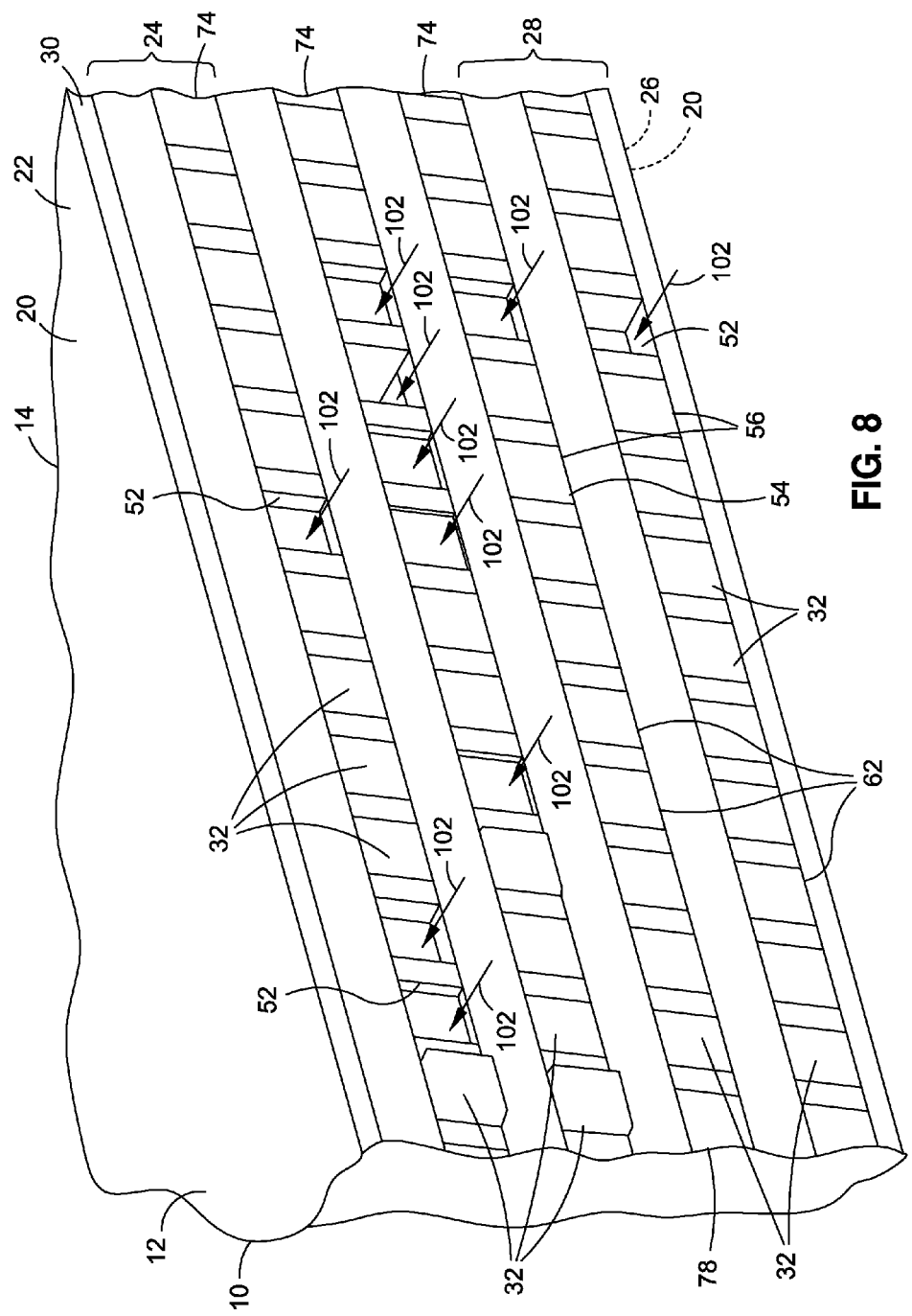
FIG. 8 is a computer simulation of an impact event of a projectile impacting a composite panel and illustrating movement of the fibers relative to the matrix as a result of controlled adhesion between the fibers and matrix.

Referring to FIG. 8, shown is a computer simulation of a composite article 10 configured as a panel 14 having layers 74 of fibers 32 embedded in a matrix 30 and illustrating relative movement of the fibers 32 within the matrix 30 along an axial direction of the fibers 32. As indicated earlier, the adhesion level 56 of the fibers 32 is preferably tailored to facilitate a desired degree of movement of the fibers 32 relative to the matrix 30 in a manner to control the length of fiber 32 that may be involved in an event. The adhesion levels 56 may be tailored to provide controlled displacement of a projectile during impact with the panel 14. Ideally, the adhesion level 56 is controlled in a manner that facilitates maximum displacement of the fiber 32 to maximize absorption by the fibers 32 of kinetic energy of a projectile prior to fiber 32 failure.

In this regard, the adhesion level 56 regulates the displacement of the fibers 32 to regulate the distance that a fiber 32 travels during an impact event. The level of adhesion 56 may be optimized for a given application and function of the composite article 10. The adhesion level 56 is preferably varied throughout the composite article 10 in a manner to avoid excessive pullout of the fibers 32 relative to the matrix 30. Excessive pullout of the fibers 32 relative to the matrix 30 may result in the projectile wedging between fibers 32 without fiber 32 breakage. In contrast, excessively high adhesion levels 56 may result in a relatively short length of fiber 32 reacting against the tensile loads resulting in premature breakage of the fiber 32 upon reaching ultimate strain of the fiber 32.

In addition, composite article 10 may be configured to control the failure mode of the composite article 10 during an impact event. The failure mode may be controlled by controlling the variation in adhesion level 56 and/or adhesion properties 62 in the composite article 10. For example, by varying the adhesion level 56 from layer 74 to layer, the failure mode of the composite article 10 may be controlled as a function of depth of the composite article 10 or panel 14. In this regard, the present disclosure provides an arrangement for varying the adhesion level 56 throughout the composite article 10 that may be contrary to an intuitive approach which may dictate increasing the overall panel 14 stiffness in an attempt to improve ballistic performance.

In contrast, the present disclosure facilitates spatial variation in adhesion levels 56 and adhesion properties 62 to control panel 14 stiffness in a manner improving ballistic performance. For example, the composite article 10 may be configured to locally increase panel 14 stiffness at a portion 24 of the panel 14 adjacent to the strike face 22 and a relatively lower adhesion level 56 throughout the remaining depth of the composite panel 14. Reduced stiffness in the remaining portion of the panel 14 may facilitate a greater degree of fiber 32 movement relative to the matrix 30 such that a greater portion of the fibers 32 may be involved in an impact event to facilitate deceleration of a projectile prior to failure of the fibers 32.

Figure 9:
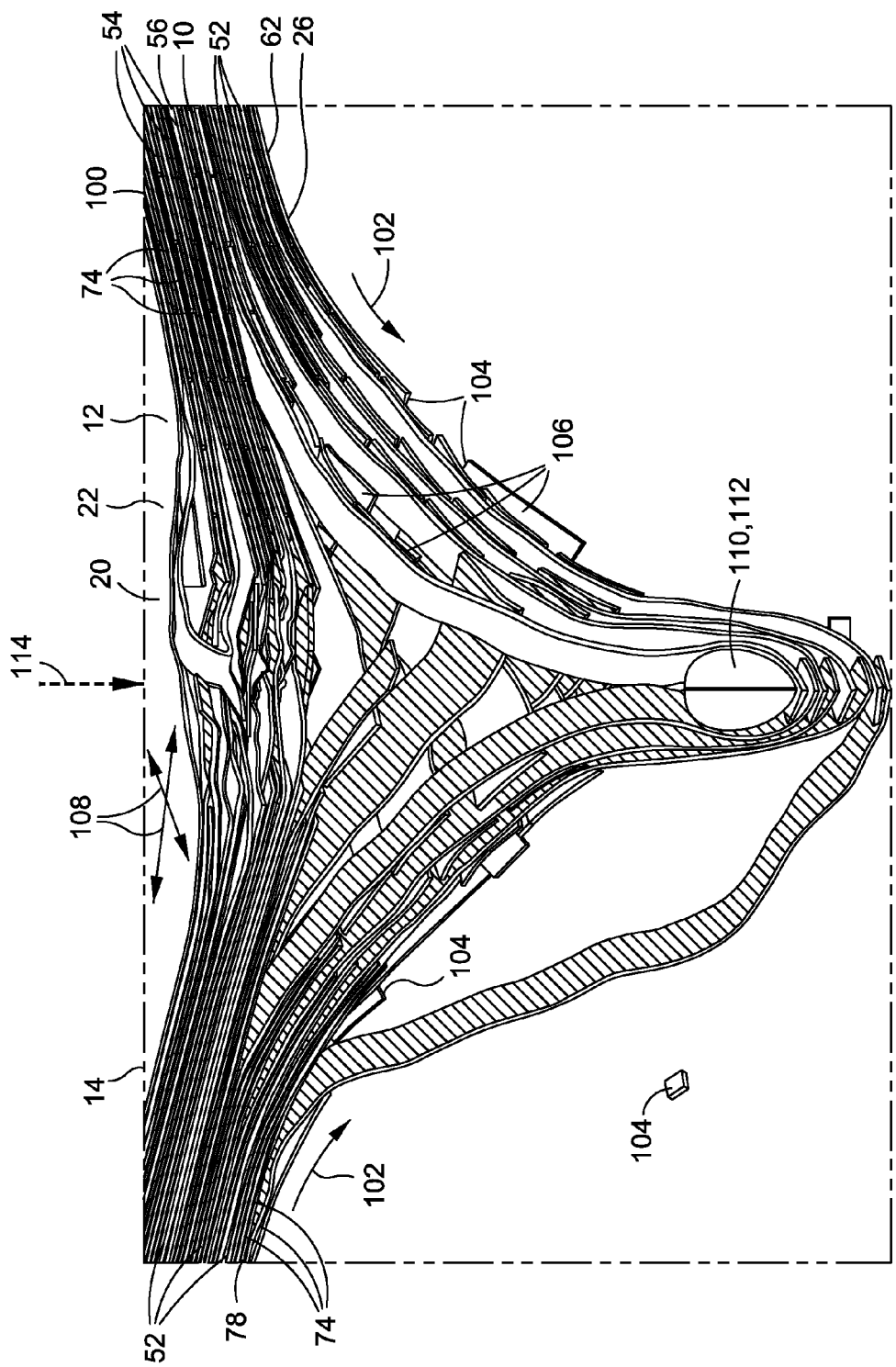
FIG. 9 is a sectional illustration of a composite article such as during an impact event and illustrating controlled fiber movement relative to the matrix in a manner controlling the penetration of the projectile through the composite article.

Referring to FIG. 9, shown is a computer simulated impact event 100 illustrating a back face 26 of a composite panel 14 after impact by a projectile 112 of a strike face 22 of the composite panel 14. The projectile 112 or object 110 in the computer simulated impact event 100 was a 5.5 millimeter steel ball impacting a panel 14 comprised of fibers 32 arranged in a cross-ply configuration along the indicated directions 108 and similar to that which is illustrated in FIGS. 1-5. In FIG. 9, the direction of movement or travel of the projectile 112 is illustrated by the arrow 114. The composite panel 14 in the computer simulated impact event 100 was configured with adhesion levels 56 facilitating deceleration and arrest of the projectile 112 prior to penetration through the back face 26. As can be seen in FIG. 9, the impact event resulted in fiber 32 movement along the indicated direction 102 and further resulting in layer 74 delaminations and matrix cracking 104 as well as fiber disbonding 106. In this regard, FIG. 9 represents the spatially varying adhesion levels 56 and adhesion properties 62 resulting in axial displacement of the fibers 32 preventing complete penetration of the projectile 112 through the composite panel 14.

Figure 10:
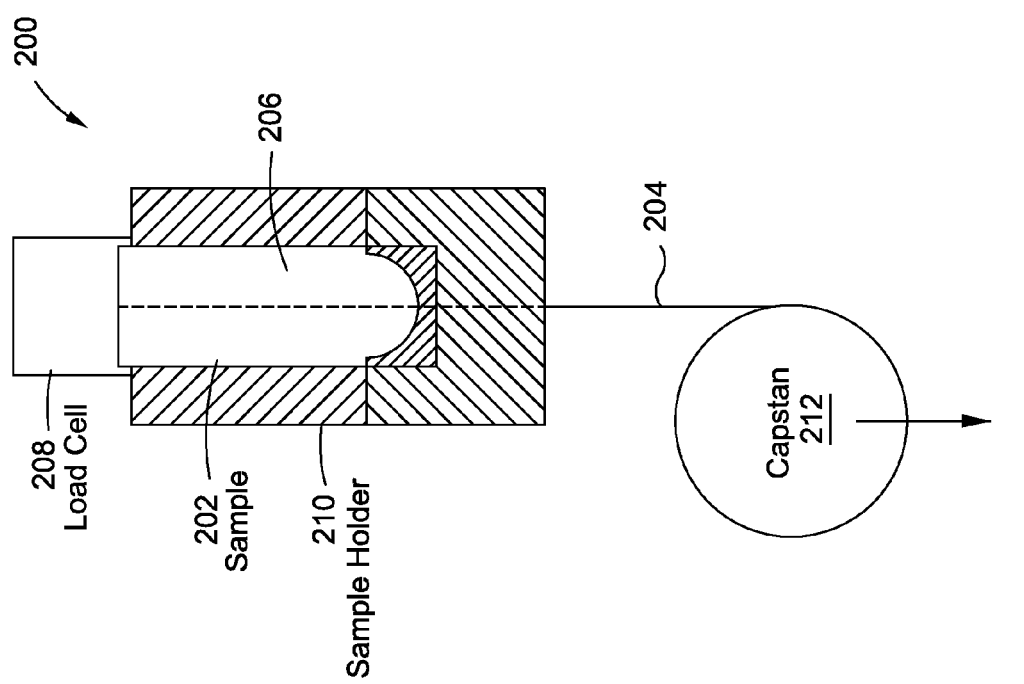
FIG. 10 is a schematic illustration of a test set up for measuring differences in axial displacement of fibers in a matrix and wherein the fibers each have different surface configurations or surface treatments.

Referring to FIG. 10, shown is a test setup 200 of a pullout test for demonstrating variations in the adhesion level 56 (FIGS. 4A-7) of the matrix 206 with different fiber 204 configurations for determining the effect of adhesion level 56 on the performance of the fibers 204 in a failure event. A plurality of fibers 204 having a known ultimate tensile strength and stiffness were prepared with different surface treatments. One of the surface treatments included removal of contaminants by cleaning the fiber 204 with acetone. The different surface treatments also included application of surface roughness 72 (FIGS. 4A-6) by abrading one of the fibers 204. The surface treatments also include the application of a release agent 68 (FIG. 6) to one of the fibers 204 using FREKOTE™ to reduce the adhesion level 56 between the fiber 204 and the matrix 206. One of the samples 202 was prepared with the fiber 204 in the as-received condition wherein the fiber 204 included oil on the fiber surface 36 (FIG. 5). As shown in FIG. 10, a plurality of the samples 202 were prepared with the different fibers 204 embedded within an epoxy matrix 206 and having fiber 204 tails extending out of the matrix 206. The samples 202 of the fiber 204 matrix 206 composite were inserted in a sample holder 210 attached to a load cell 208. The fibers 204 tails were attached to a capstan 212. Tensile load was applied and recorded as the capstan 212 displaced as illustrated in FIG. 10.

Figure 11:
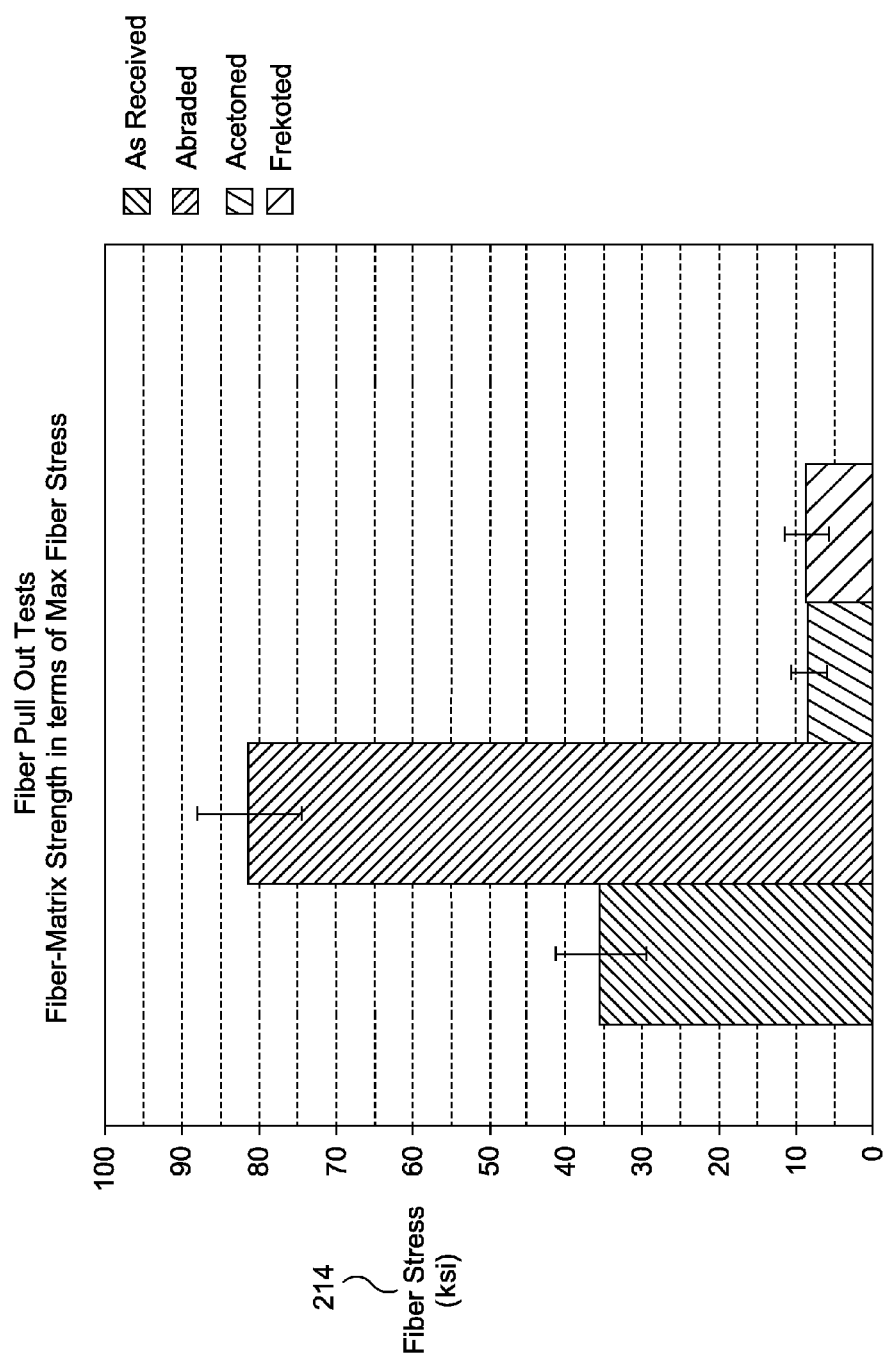
FIG. 11 is a graph of fiber stress for the test of set up of FIG. 10 and illustrating the differences in adhesion levels between the matrix and the fibers having different surface configurations or treatments.

Referring to FIG. 11, shown is a graph of fiber stress 214 and illustrating the significance of the surface treatment or lack thereof on the level of adhesion 56 (e.g., FIGS. 4A-7) attainable at the interface 52 (e.g., FIGS. 4A-5) between the fiber 204 (FIG. 10) and matrix 206 (FIG. 10). As shown in FIG. 11, the as-received fiber 204 ("As Received") attained a stress of 35 ksi prior to pullout from the matrix 206. In contrast, the fiber 204 configuration that was cleaned with acetone ("Acetoned" in FIG. 11) and the fiber 204 configuration that was cleaned with acetone and then coated with a release agent 68 ("Frekoted" in FIG. 11) attained a fiber stress 214 of approximately 9 ksi prior to pullout from the matrix 206. The fiber 204 (FIG. 10) configuration to which surface roughness 72 (e.g., FIGS. 4A-6) was applied by abrading the fiber 204 ("Abraded" in FIG. 11) provided the highest adhesion level 56 attaining a tensile stress of 81 ksi prior to pullout from the matrix 206. Notably, the fiber stress 214 attained during pullout of the different fiber 204 configurations were all below the ultimate tensile stress capability of 150 ksi of the fiber 204 indicating that the interface 52 (e.g., FIGS. 4A-5) between the fiber 204 (FIG. 10) and the matrix 206 (FIG. 10) could be optimized to increase the adhesion level 56 (e.g., FIGS. 4A-7) with the matrix 206.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite article, comprising:
a plurality of fibers at least partially embedded within a matrix and forming a plurality of layers arranged in a layer stack of the composite article;
the fibers in one of the layers being oriented at an angle that is different than the fibers in another one of the layers;
the fibers adhering to the matrix at a level of adhesion;
at least one of the layers having fibers oriented parallel to one another and arranged in a plurality of fiber groups, each fiber group including a plurality of adjacent fibers;
wherein the fibers in at least one of the fiber groups in a layer have:
an adhesion level along a lengthwise portion of the fibers of the fiber group being greater than the adhesion level along an entire length of the fibers of another fiber group in the same layer; and
the adhesion level along the lengthwise portion of the fibers of the fiber group being less than the adhesion level at another lengthwise portion of the same fiber group.

2. The composite article of claim 1 wherein the adhesion level along the length of at least one of the fibers in at least one of the layers varies in at least one of the following manners:
generally uniform increases and decreases in adhesion levels along the fiber length;
gradual increases and decreases in adhesion levels along the fiber length;
sinusoidally changing increases and decreases in adhesion levels along the fiber length.

3. The composite article of claim 1 wherein:
at least a portion of one of the fibers having a release agent reducing the adhesion level of the fiber.

4. The composite article of claim 1 wherein:
at least a portion of one of the fibers having a bonding agent increasing the adhesion level of the fiber.

5. The composite article of claim 1 wherein:
at least a portion of one of the fibers having a different surface roughness relative to a remaining portion of the fiber and resulting in a higher adhesion level.

6. The composite article of claim 1 wherein:
the fiber comprises a substantially optically transparent fiber;
the matrix comprises a substantially optically transparent polymeric matrix; and
the fiber and the matrix define an interface being substantially optically transparent.

7. The composite article of claim 1 wherein at least one of the matrix and the fiber is formed from at least one of the following:
a thermoplastic material comprising at least one of the following: fluorocarbons, polyamides, polyethylenes, polyesters, polypropylenes, polycarbonates, polyurethanes, polyetheretherketone, polyetherketoneketone;
a thermoset comprising at least one of the following: polyurethanes, phenolics, polyimides, bismaleimides, polyesters, epoxy; and
glass.

8. The composite article of claim 1 wherein:
the adhesion level progressively increases and/or changes in a stepwise manner across the layer stack from the outermost layer on one side of the layer stack to the outermost layer on the opposite side of the layer stack.

9. The composite article of claim 1 wherein:
the composite article is configured as a ballistic panel having a strike face and a back face;
the strike face configured to receive an impact from an object.

10. The composite article of claim 9 further including:
at least one additional layer formed of glass or ceramic and bonded to the strike face.

11. The composite article of claim 1 wherein:
one or more of the fibers has a different composition than the remaining fibers in the composite article;
the different composition of the one or more of the fibers resulting in a different adhesion level relative to the adhesion level of the remaining fibers.

12. The composite article of claim 1 wherein:
at least one pair of layers of the layer stack are bonded together with a low adhesion level relative to the adhesion level bonding the remaining layers of the layer stack.

13. A composite article, comprising:
a plurality of fibers at least partially embedded within a matrix and forming a plurality of layers arranged in a layer stack of the composite article;
the fibers in one of the layers being oriented at an angle that is different than the fibers in another one of the layers;
the fibers and the matrix adhering to one another and having adhesion properties of an adhesive bond at an interface between the fibers and the matrix;

the adhesion properties of the adhesive bond at the interface comprising at least one of stiffness, ductility, and strain-to-failure;

at least one of the layers having fibers oriented parallel to one another and arranged in a plurality of fiber groups, each group including a plurality of adjacent fibers;

wherein the fibers in at least one of the fiber in a layer have:

an adhesion property along a lengthwise portion of the fibers of the fiber group being greater than the adhesion property along an entire length of the fibers of another fiber group in the same layer; and the adhesion property along the lengthwise portion of the fibers of the fiber group being less than the adhesion property at another lengthwise portion of the same fiber group.

14. A method of manufacturing a composite article, comprising the steps of:

providing a plurality of layers in a layer stack, each layer including a plurality of fibers at least partially embedded within a matrix and adhering to the matrix at a level of adhesion, the fibers in one of the layers being oriented at an angle that is different than the fibers in another one of the layers, at least one of the layers having fibers oriented parallel to one another and arranged in a plurality of fiber groups, each fiber group including a plurality of adjacent fibers;

providing an adhesion level along a lengthwise portion of the fibers of at least one of the fiber groups that is greater than the adhesion level along an entire length of the fibers of another fiber group in the same layer; and providing the adhesion level along the lengthwise portion of the fibers of the at least one fiber group to be less than the adhesion level at another lengthwise portion of the same fiber group.

15. The method of claim 14 further including:

varying the adhesion level along the the lengthwise portion of at least one of the fibers in at least one of the layers in at least one of the following manners:

generally uniform increases and decreases in the adhesion level along the lengthwise portion;

gradual increases and decreases in the adhesion level along the lengthwise portion; and sinusoidally changing increases and decreases in the adhesion level along the lengthwise portion.

16. The method of claim 14 wherein:

at least a portion of one of the fibers has a release agent decreasing the adhesion level of the fiber.

17. The method of claim 14 wherein:

at least a lengthwise portion of at least one of the fibers has a bonding agent increasing the adhesion level of the fiber.

18. The method of claim 14 wherein:

at least a lengthwise portion of at least one of the fibers has a different surface roughness relative to a remaining lengthwise portion of the at least one of the fibers and resulting in a higher adhesion level.

19. The method of claim 14 wherein:

the fibers comprise substantially optically transparent fibers;

the matrix comprises a substantially optically transparent polymeric matrix; and the fibers and the matrix define an interface being substantially optically transparent.

20. The method of claim 14 wherein at least one of the matrix and the fibers is formed from at least one of the following:

a thermoplastic material comprising at least one of the following: fluorocarbons, polyamides, polyethylenes, polyesters, polypropylenes, polycarbonates, polyurethanes, polyetheretherketone, polyetherketoneketone;

a thermoset comprising at least one of the following: polyurethanes, phenolics, polyimides, bismaleimides, polyesters, epoxy; and glass.

* * * * *